FIG. I

United States Patent Office 3,582,460
Patented June 1, 1971

3,582,460
IMPROVING THE FREENESS OF ASBESTOS BY TREATMENT WITH SILICA SOL
Solomon George Lipsett, Montreal, Quebec, Canada, assignor to Asbestos Corporation Limited, Quebec, Canada
Continuation of application Ser. No. 599,295, Dec. 5, 1966. This application Feb. 20, 1970, Ser. No. 16,636
Claims priority, application Canada, Dec. 8, 1965, 947,343
Int. Cl. C03b 37/00
U.S. Cl. 162—3
6 Claims

ABSTRACT OF THE DISCLOSURE

Asbestos fibers are treated, as described, with aqueous silica sols, then dried. The treatment greatly increases the freeness of the fibers and is a valuable help in filtering compositions containing asbestos.

This application is a continuation of copending Ser. No. 599,295 filed Dec. 5, 1966 and now abandoned.

FIELD OF THE INVENTION

This invention relates to asbestos fiber and to products obtained therefrom and, in particular, this invention relates to a proces for improving the freeness or filterability of asbestos.

DESCRIPTION OF THE PRIOR ART

Asbestos is now used in a variety of products including asbestos-cement materials for several uses, e.g. as construction materials. It is necessary, in these conversion processes, to add water to the mixture of asbestos, cement and other materials in order to hydrate the cement constituent and cause it to set. In the process generally referred to as the "wet process," excess water is used, for several reasons: it enables sheets to be made on cylinder machines or on other machines similar to those used in the paper industry; intimate mixing of the components is secured; the mixture may be beaten before filtration to break open clusters of asbestos fibers; complete hydration is rendered certain. The excess water must then be removed from the mixture.

Freeness varies to a great extent between different grades of asbestos and between the asbestos obtained from different deposits.

Several processes have been proposed for improving the freeness of asbestos fiber, including heat treatment of the fiber and treatment with sodium or potassium silicate. In the former, the degree and time of heating must be very carefully controlled since overheating seriously affects the properties of the fiber. Even with such careful control, the tensile strength of the fiber is still reduced. In the latter treatment, alkali metal silicates, usually sodium silicate, are used. Such silicates are highly alkaline materials and their application to asbestos fibers coats them with a highly alkaline film. There follows an accelerating effect on the setting of a cement and, consequently, a deleterious effect on the curing of the asbestos-cement material. The disadvantages inherent in these processes handicap their utility.

SUMMARY OF THE INVENTION

It is an object of the present invention to provide a simple and economical process for improving the freeness of asbestos fibers.

Other objects and advantages will become clear from the description of the invention to follow.

Figure 1:
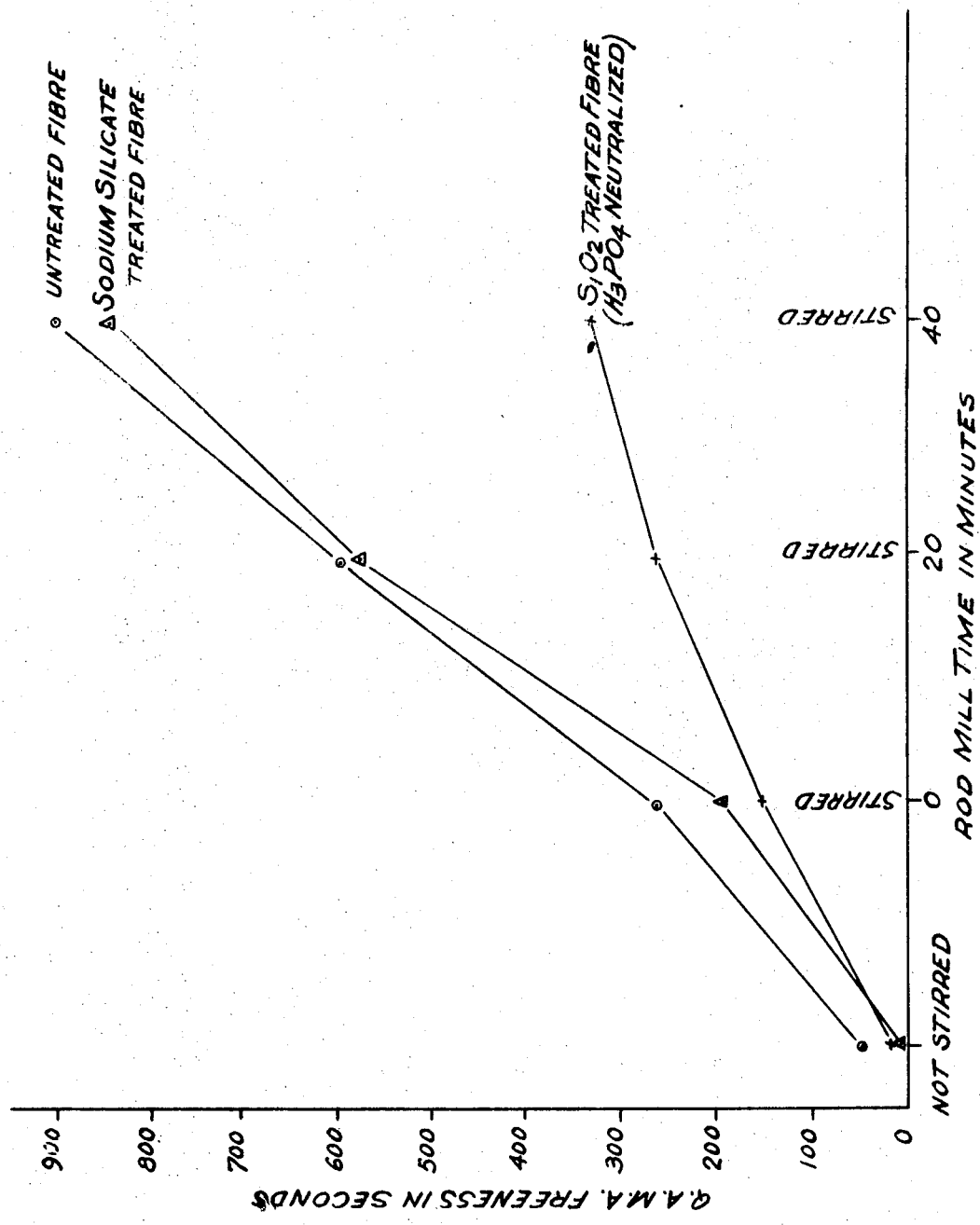
Figure 2:
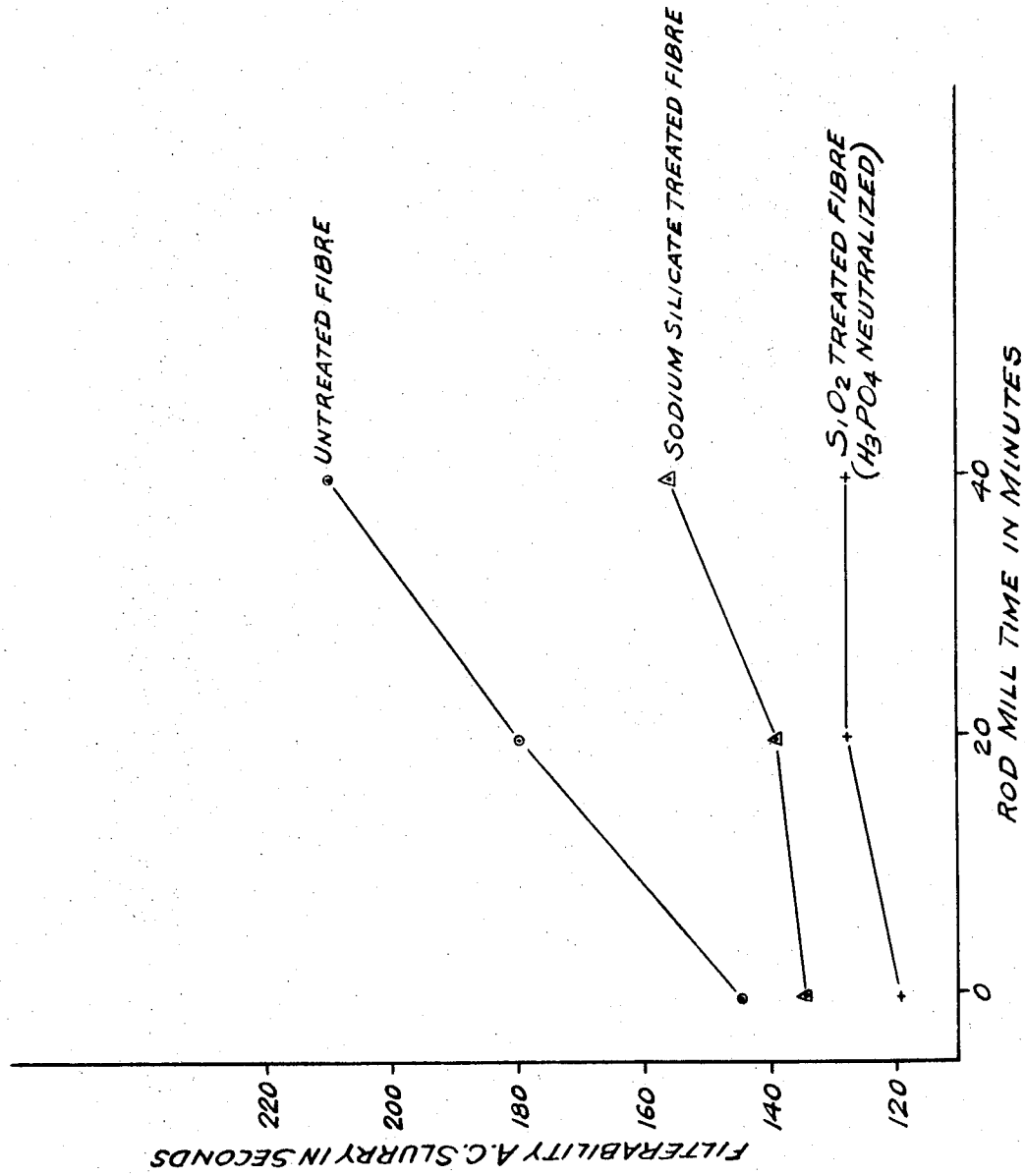

In the accompanying drawings:

FIGS. 1 and 2 represent graphs of comparative data showing the superior effect obtained by the process of the invention upon the freeness of asbestos fibers.

Silicic acid has a very low solubility in water. Various figures for solubility have been reported, for example, the solubility of silica in water has been reported as approximately 0.018% at 25-35° C. Such solutions contain too low a percentage of silica to be of practical value in the treatment of asbestos for improving freeness. Silica gels, either in the jelly form or in the dried, hard form, are not suitable for the treatment of asbestos since they are not liquid and do not readily flow over the fibers or into the interstices between fibers or bundles of fibers. It has now been found, however, that aqueous silica sols, which can be prepared with a relatively high concentration of silica, being quite fluid, with the silica in the colloidal condition, have good spreading, covering, and penetrating powers with respect to asbestos fibers and that, when asbestos is so treated and the product dried, the freeness of asbestos is greatly increased by this treatment. The application of such silica sol does not materially affect the alkalinity of the asbestos fibers as shown by the pH of slurries in water made therefrom.

In accordance with the present invention, a process for improving the freeness of asbestos fibers is provided which comprises treating said fibers with an aqueous silica sol, to deposit on the fibers colloidal silica, expressed as $SiO_2$, in an amount of about 2.5% by weight or less, and drying said treated fibers.

The $SiO_2$ deposited on the fibers, after drying, is preferably 1.4% or less. A substantial improvement in the freeness of the fibers is shown with as litle as 0.6% charge. Little improvement is shown below 0.2%.

Aqueous silica sols are substantially liquid suspensions of colloidal silicic acid particles, in the form of molecules of monomeric silicic acid and polymers thereof up to average molecular weights of about 6,000–10,000 or even higher. At higher molecular weights, silica gels may form.

Liquid aqueous silica sols may gel if their apparent average molecular weight exceeds the range of 6,000–10,000. However, this range may, in some instances, be exceeded without gelation. Moreover, gelation is a function of time. It will therefore be apparent that all liquid aqueous silica sols are within the scope of the present invention.

Silica sols are available commercially.

Silica sols are prepared by a variety of methods, including treatment of sodium silicate or similar silicate solutions with a reagent to neutralize the alkali. Such reagents include inorganic acids, e.g. $H_3PO_4$, $H_2SO_4$, HCl, as well as sodium bicarbonate, ammonium sulphate and aluminum sulphate. Other methods of preparing silica sols include redispersion of precipitates, subjecting thixotropic agglomerates to shear forces, heating certain silica gels and passing dilute sodium silicate through a bed of an acid-regenerated cation exchanger, this last method resulting in salt-free sols. Dilute silica sols may be concentrated by evaporation, or other means, under conditions known in the art.

In accordance with the present invention, silica sols, irrespective of the process according to which they are produced, improve the freeness of asbestos fiber. However, the degree of improvement varies between different methods. Also, the sols may contain dissolved salts in some cases which may be detrimental, if present in excessive amounts, to the properties of the fiber and to the strength of asbestos-cement products made therefrom. However, as shown above, such salts can be removed, if detrimental and if present, by treatment with ion-exchange resins, as is known in the art.

A preferred manner of making the silica sols used for treatment of asbestos fibers in accordance with the present invention, consist in neutralizing sodium silicate aqueous solutions with inorganic acids, preferable phosphoric, sulphuric or hydrochloric acids. The sodium silicate so used should preferably have a high ratio of $SiO_2$ to $Na_2O$ since this requires less acid for the neutralization and produces sols with relatively low content of dissolved salts, and such sols may be used without removal of the dissolved salts.

Asbestos fibers can be treated with silica sols in accordance with the process of the invention by various means, for example by feeding the untreated asbestos fibers at a controlled rate into an enclosure in which the fibers are maintained in suspension in air and spraying a controlled amount of aqueous silica sols onto naid suspended fibers. The sprayed fibers are then treated in a known manner to dry the same.

DESCRIPTION OF THE PREFERRED EMBODIMENTS

The present invention will now be described in further detail with reference to the following nonlimiting examples. Percentages are by weight unless otherwise indicated.

EXAMPLE 1

(A) Preparation of silica sol by neutralization with HCl

A silica sol was prepared from a commercially available 40% aqueous solution of sodium silicate in which the molecular ratio of $Na_2O$ to $SiO_2$ was found, by analysis, to be 1:3.53.

110 grams of this 40% aqueous solution of sodium silicate were diluted to a volume of 2 liters by the addition of distilled water.

Separately, an HCl solution was prepared by diluting 25 ml. of 23° Baumé hydrochloric acid to a volume of 2 liters by addition of distilled water.

To a selected amount of the dilute sodium silicate solution, an amount of the dilute hydrochloric acid solution was added, while agitating mechanically, until neutrality was obtained, using phenolphthalein indicator. The pH of the resultant silica sol was approximately 8.3. The silica sol contained 0.008 g. $SiO_2$/ml.

(B) Treatment of asbestos fiber and filtration rates

Four 10 g. samples of asbestos fiber of 5K-grade were isolated. Three of these samples were treated with quantities of the aforesaid silica sol, diluted with water when necessary to ensure complete penetration upon mixing, to impart 0.6, 1.2, and 2.4% $SiO_2$, respectively, to the asbestos. The treated fiber samples were dried at 100° F. The fourth sample was used as control and received no addition of colloidal silica. The same procedure was repeated with 6D-grade and 4T-grade asbestos, two samples of each grade being treated by addition of 1.2 and 2.4% $SiO_2$, applied as silica sol, a third one being used as control.

The time of filtration was measured by the freeness test. For this test, each sample was treated as follows:

"Prepared water" was made by adding 2 grams of calcium hydroxide and 3 grams of hydrated calcium sulphate to 1 liter of distilled water. The mixture was allowed to stand for 24 hours with frequent shaking and any undissolved residue then allowed to settle. The supernatant liquid then constituted "prepared water."

A 10 g. sample of the asbestos to be tested was added to 500 ml. of "prepared water" and the mixture beaten for 90 seconds in a one liter beating apparatus equipped with a propeller-type laborator stirrer roated at high speed. Immediately after beating, the mixture was poured into the freeness tester and the freeness determined by the procedure "Freeness Test for Asbestos" described in "Testing Procedures for Chrysotile Asbestos Fiber," 1966 edition, proposed by and prepared jointly by the Asbestos Textile Institute, the Mineral Fiber Products Bureau and Quebec Asbestos Mining Associates. The results were as shown in Table I.

TABLE I

| Asbestos grade | $SiO_2$ added | Percent Reduction in time of filtration compared to control |
|---|---|---|
| 5K | 0.6 | 68.5 |
| | 1.2 | 89.5 |
| | 2.4 | 96.6 |
| 6D | 1.2 | 81.0 |
| | 2.4 | 94.6 |
| 4T | 1.2 | 88.3 |
| | 2.4 | 92.2 |

EXAMPLE 2

(A) Preparation of silica sol by neutralization with $H_2SO_4$

A diluted sodium silicate aqueous solution was first prepared as shown in Example 1A.

Separately an aqueous solution of $H_2SO_4$ was prepared by selecting an appropriate amount of concentrated sulphuric acid and diluting it to 80 times its volume by addition of distilled water. The sulphuric acid solution was then added to the silicate solution, while agitating mechanically, until neutrality was obtained, using phenolphthalein indicator (pH approx. 8.3). The silica sol contained 0.012 g. $SiO_2$/ml.

(B) Treatment of asbestos fiber and filtration time

Two 10 g. samples 5K asbestos were isolated. One sample was treated with an amount of the silica sol prepared as shown under 2A above, diluted with water to ensure complete penetration upon mixing, to impart 0.6% $SiO_2$ to the asbestos. The sample was dried at 105° C. The other sample was used as control.

The filtration times were then measured as described in Example 1B, above. The freeness of the control sample was measured as 238 seconds, while the freeness of the sample treated with silica sol was measured as 69 seconds, a reduction in the filtration time of 71%.

EXAMPLE 3

(A) Preparation of silica sol by neutralization with $H_3PO_4$ 100 grams of the 40% aqueous solution of sodium silicate was diluted to a volume of 2 liters by the addition of distilled water.

Separately, a selected volumes of 85% (w./w.) $H_3PO_4$ was diluted to 80 times its volume with distilled water.

The last-mentioned solution was then added to the silicate solution, while agitating mechanically, until neutrality was obtained using phenolphthalein indicator. The sol obtained had a pH of approximately 9 and contained 0.0106 g. $SiO_2$/ml.

(B) Treatment of asbestos fiber and filtration times (1) Two series of results of filtration times of asbestos treated with phosphoric acid-prepared silica sols are shown in the following Tables II and III. In Table II, 10 g. samples of asbestos were used while in Table III 1000 g. samples were used. In each case, the requisite amount of silica sol to provide the specified amount of $SiO_2$ was taken, diluted to ensure uniform mixing and mixed with the asbestos sample. In each series of tests, one sample received no addition of colloidal silica and was used as control. In Table II, all samples were dried at 105° C. while in Table III, all samples were dried at 65–75° C. For the tests shown in Table II, the Freeness Test was determined as described in Example 1B. For those shown in Table III, this procedure was modified as follows: the mixture was beaten for one minute in a one liter beating apparatus, equipped with a paddle. The paddle was 40 mm. wide and 100 mm. high and was rotated at 1500 r.p.m.

TABLE II

| Asbestos grade | SiO₂ added | Percent Reduction in time of filtration compared to control |
|---|---|---|
| 5K | 0.2 | 26.7 |
| 5K | 0.4 | 60.1 |
| 5K | 0.6 | 82.0 |
| 5D | 0.6 | 83.9 |
| 4T | 0.6 | 79.7 |
| 6D | 0.6 | 82.5 |

TABLE III

| Asbestos grade | SiO₂ added | Percent Reduction in time of filtration compared to control |
|---|---|---|
| 5K | 1.0 | 83.3 |
| 5K | 1.2 | 87.1 |
| 4T | 0.6 | 75.7 |
| 4T | 1.0 | 82.5 |
| 4T | 1.2 | 87.2 |

(2) A series of silica sols was made in which diluted phosphoric acid was added to diluted sodium silicate solution in varying amounts to produce silica sols in which the pH ranged from 4 to 9. The sols were made as described in Example 3A except that the end point was controlled by determination of pH with a glass electrode. The phosphoric acid solution was added to the sodium silicate solution until the desired pH was obtained in the mixture.

10 g. portions of asbestos grade 5K were treated with the requisite amount of the silica sol to impart 0.6% $SiO_2$ to the asbestos. The products were dried at 105° C. The Freeness Test was determined by the modified procedure described in connection with the tests shown in Table III on each sample and compared with the Freeness Test on a control sample. The results were as shown in Table IV.

TABLE IV

Asbestos, grade 5K; SiO₂ added, 0.6%.

| pH of silica sol | Percent reduction [1] |
|---|---|
| 9 | 73.4 |
| 7 | 74.9 |
| 6 | 72.3 |
| 5 | 79.6 |
| 4 | 80.8 |

[1] In time of filtration compared to control.

EXAMPLE 4

Two 10 g. samples of asbestos of 5K grade were treated as in Example 1B with silica sol made with hydrochloric acid and two 10 g. samples of the same grade of asbestos were treated as in Example 3B with silica sol made with phosphoric acid. In each instance, the charge of SiO₂ imparted to the asbestos was 0.6%. The treated samples were dried either at 100° F. (37.8° C.) or at 105° C. as shown in the following table. Another portion of the asbestos was used as control and received no addition of silica sol. The Freeness Test was then carried out as described in Example 1B. The results were as shown in Table V.

TABLE V

| Acid used in preparation of silica sol | Temperature of drying (° C.) | Percent reduction in time of filtration compared to control |
|---|---|---|
| HCl | 37.8 | 68.5 |
| HCl | 105 | 66.6 |
| H₃PO₄ | 37.8 | 83.1 |
| H₃PO₄ | 105 | 82.1 |

These results showed no significant difference between the results obtained when the samples were dried at 37.8° C. and when dried at 105° C. The results also showed an enhanced effect when H₃PO₄ was used in the preparation of the silica sol. The enhanced effect of the presence of phosphate was found to be most pronounced when the amount of SiO₂ added to the asbestos was less than 1% and when the SiO₂:Na₂O ratio of sodium silicate used for the preparation of the silica sol was high as in the present example, when the molecular ratio was 3.53:1.

EXAMPLE 5

Asbestos-cement slurry freeness

Examples 1–4 show the results of filtration tests made on asbestos treated with silica sols compared with asbestos not so treated. In the present example, asbestos-cement slurries were made, and their time of filtration determined.

The asbestos samples used for for these asbestos cement (A.C.) slurries were the treated samples and controls prepared in the same manner as those described in connection with the tests shown in Table III.

The asbestos-cement slurry freeness was determined as follows:

20 grams of dried, treated asbestos (or control) were placed in a 4 liter beaker and wetted with 200 ml. of "prepared water." The large lumps were broken down with a glass rod and 160 g. of portland cement and 800 ml. of "prepared water" were added. The resulting mixture was stirred at 1500 r.p.m. for 6 minutes with a laboratory stirrer to form a slurry, transferred to a 1-liter graduate and inverted 20 times. The asbestos-cement slurry was then transferred to an A.C. slurry filtration apparatus consisting of a vacuum based slurry box (75 mm. wide by 205 mm. long by 75 mm. high); and a vacuum of 200 mm. of mercury was applied and maintained on the base of the slurry box until the surface of the slurry lost its sheen. The interval of time between applying the vacuum and the loss of the slurry's sheen was recorded to the nearest second as the time of filtration of the A.C. slurry.

The results were as shown in Table VI.

TABLE VI

| Asbestos grade | Percent SiO₂ added | Time of filtration (sec.) | Percent reduction in time of filtration |
|---|---|---|---|
| 4T | 0.0 | 143 | |
| 4T | 0.6 | 95 | 33.6 |
| 4T | 1.0 | 94 | 34.3 |
| 4T | 1.2 | 95 | 33.3 |
| 5K | 0.0 | 168 | |
| 5K | 0.6 | 110 | 34.5 |
| 5K | 1.0 | 98 | 41.7 |
| 5K | 1.2 | 94 | 44.1 |

EXAMPLE 6

Tables VII–X show the results of further tests made on chrysotile asbestos fiber of grade 4T, 5K, 5D and 6D, respectively.

For each grade of asbestos fiber tested, comparative results were obtained between fibers retained as control, fibers treated with silica sols obtained by neutralization with H₃PO₄ (prepared as shown in Example 3A), and fibers treated with silica sols obtained by neutralization with HCl (prepared as shown in Example 1A). 1000 g. lots of the fibers were treated with the requisite amount of the silica sol, diluted where necessary to ensure complete penetration upon mixing, to impart the specified percentage of SiO₂ to the asbestos. The samples were dried at 105° C. The sodium silicate used for the preparation of the silica sols was an aqueous sodium silicate of commercial RU grade sold by National Silicates Limited, having a 50.0% concentration and a molecular Na₂O:SiO₂ ratio of 1:2.47 and the amount used in preparing the sols was equivalent in SiO₂ content to the amount of silicate used in Examples 1A and 3A.

The freeness of the fiber when determined, was determined by the modified procedure described in connection with the tests shown in Table III. The asbestos-cement slurry was obtained as shown in Example 5 and the time of filtration of the slurry was also determined as described in Example 5.

The results obtained were as shown in the following tables:

TABLES VII AND VIII

| Test Number | Method of preparation of silica sol | Percent $SiO_2$ added | Time of filtration of asbestos-cement slurry (sec.) | Percent reduction in time of filtration |
|---|---|---|---|---|
| Table VII—4T-grade asbestos: | | | | |
| 1 | | | 143 | |
| 2 | 3A | 0.6 | 121 | 15.4 |
| 3 | 3A | 1.0 | 116 | 18.8 |
| 4 | 3A | 1.4 | 112 | 21.7 |
| Table VIII—5K-grade asbestos: | | | | |
| 1 | | | 168 | |
| 2 | 3A | 0.6 | 126 | 25.0 |
| 3 | 3A | 1.0 | 120 | 28.6 |
| 4 | 3A | 1.4 | 116 | 31.0 |

TABLES IX AND X

| Test Number | Method of preparation of silica sol | Percent $SiO_2$ added | Freeness of fiber (sec.) | Time of filtration of asbestos-cement slurry (sec.) | Percent reduction in time of filtration of A.C slurry |
|---|---|---|---|---|---|
| Table IX—5D-grade asbestos: | | | | | |
| 1 | | | 144 | 152 | |
| 2 | 3A | 0.6 | 43 | 119 | 21.7 |
| 3 | 3A | 1.0 | 38 | 113 | 25.7 |
| 4 | 3A | 1.4 | 30 | 111 | 27.0 |
| 5 | 1A | 0.6 | 44 | 120 | 21.1 |
| 6 | 1A | 1.4 | 29 | 112 | 26.3 |
| Table X—6D-grade asbestos: | | | | | |
| 1 | | | 303 | 214 | |
| 2 | 3A | 0.6 | 81 | 132 | 38.3 |
| 3 | 3A | 1.0 | 79 | 118 | 44.9 |
| 4 | 3A | 1.4 | 77 | 117 | 45.3 |
| 5 | 1A | 0.6 | 124 | 133 | 37.9 |
| 6 | 1A | 1.0 | 95 | 119 | 44.4 |
| 7 | 1A | 1.4 | 77 | 112 | 47.: |

EXAMPLE 7

Using the method described in Example 3A, a silica sol containing 1.06% $SiO_2$ was prepared by treatment with phosphoric acid of an aqueous solution of sodium silicate until pH 9 was obtained. The sol obtained formed a soft gel after 5 hours. Six days later, this gel was beaten with a mechanical stirrer. The product became clear, fluid and homogenous to the eye. The requisite amount of this product to impart 0.6% $SiO_2$, diluted with water to ensure complete penetration upon mixing, was mixed with 10 g. of 5K-grade asbestos. The treated asbestos was dried at 105° C. and its freeness was determined by the modified procedure described in connection with the tests shown in Table III. The reduction in time of filtration of this treated sample was 76.0% compared to that of a control treated in the same manner but without addition of $SiO_2$.

For comparison purposes, a further 10 g. lot of asbestos was treated with a silica sol prepared exactly as shown in Example 3A and tested as shown above. The reduction in time of filtration was 77.2%.

EXAMPLE 8

A commercially available aqueous silica sol sold under the trademark Nalcoag No. 1030 by Alchem Ltd. was obtained. The specifications of this sol were as follows:

| | |
|---|---|
| Percent colloidal, as $SiO_2$ | 30 |
| pH | 10.2 |
| Specific gravity at 68° F. | 1.205 |
| Average surface area, square meters per gram | 190–270 |
| Average particle size millimicrons | 11–16 |
| Freezing point, ° F. | 32 |
| $Na_2O$, percent | 0.40 |

Two 10 g. lots of 5K-grade asbestos were isolated and one lot was retained as control. The other lot was treated with 0.5 g. of the silica sol diluted with water to facilitate penetration and both lots were dried at 105° C. The freeness of each lot was determined by the modified procedure described in connection with the tests shown in Table III.

The treated lot, having a charge of 1.5% $SiO_2$, showed a reduction of 68.8% in the time of filtration when compared with the control lot.

EXAMPLES 9 AND 10

Rod mill tests

In order to duplicate practical operating conditions wherein, in most applications, the bundles of asbestos fibers are broken up, asbestos fibers (Example 9), which had previously been treated in accordance with the invention, were subjected to treatment in a rod mill, following which the freeness of the fibers (Example 9) or the time of filtration of an A.C. slurry (Example 10) formed from said fibers were determined.

A sodium silicate solution was prepared as follows: sodium silicate commercially available under the trade name S–35 produced by National Silicates Limited, Toronto, Ontario, and containing a silica to sodium oxide weight ratio of 3.75 was diluted to 10% $SiO_2$. For example, 1 liter of solution was prepared by treating 331 ml. of sodium silicate S–35 with 669 ml. of distilled water.

Separately, a solution of phosphoric acid 85% was diluted by addition of an equal weight of distilled water. One liter of the sodium silicate solution obtained as above was neutralized with 200 ml. of phosphoric acid solution obtained as above. The resultant silica sol had a content of 8.14% of $SiO_2$.

Fiber spraying (A) 4D-grade asbestos fibers (12 kg.), as shown in Tables XI and XII, were treated as follows: The fibers were fed to an air conveying system. The silica sol was sprayed on the air suspended fibers by use of a spraying nozzle. The axis of the spray pattern was made to coincide with the axis of the flow of the air suspended fibers. The fibers thus treated were passed through a radial type fan to a vertical cyclone collector and discharged. The air discharge of the cyclone collector was passed through a second radial type fan thence to the atmosphere. The duct leading from the first radial fan to the cyclone collector had an 8 inch diameter and the air velocity therein was approximately 4000 feet per minute.

The sprayed fibers were collected and air dried to a moisture content of approximately 1%. The treatment deposited on the fibers an amount of silica of approximately 1.1% $SiO_2$ by weight of the fibers.

(B) In the same manner as described above, another lot of 4D-grade asbestos fibers was sprayed with a 10% sodium silicate solution obtained by diluting S–35 sodium silicate with a calculated amount of water and air dried. They contained approximately 1.23% sodium silicate by weight.

(C) Another lot of untreated 4D-grade asbestos fibers was retained as control.

Each one of the three lots of asbestos, treated as described above, was moistened with 3 kg. of water and hand mixed for 1 minute. Samples were then collected (three samples for each lot). The freeness of one sample of each lot was then determined without beating. The second sample of each lot was subjected to a stirring treatment for 6 minutes in a 1 liter beating apparatus, equipped with a paddle 40 mm. wide, 100 mm. high, rotating at 1500 r.p.m., following which freeness was determined. The third sample of each lot (three samples in all) was retained (see Example 10).

The balance of the three lots was separately treated in a rod mill.

The rod mill had the following dimensions.

Dimensions of the mill: Mm.
Diameter _____ 500
Length _____ 750
Dimensions of the rods:
Diameter _____ 60
Length _____ 725
Number of rods _____ 18

EXAMPLE 9

The moistened asbestos was charged into the rod mill, described above and the 18 rods were placed on top of the asbestos. The rod mill was then rotated at a speed of 36 r.p.m. Two samples from each lot were taken after 20 minutes and 40 minutes, respectively, of rod mill treatment. Freeness was determined for each lot from one of the samples taken after 20 minutes and 40 minutes of rod milling. The other samples taken from each lot after 20 and 40 minutes of rod milling were retained (see Example 10). Table XI shows the results of the freeness on the samples without stirring, after stirring, and 20 minutes and 40 minutes, respectively, of treatment in the rod mill.

EXAMPLE 10

The nine samples (20 grams each) retained (see above) were treated as shown in Example 5 and the time of filtration measured as shown therein. The results are as shown in Table XII.

TABLE XI

| Material | Freeness (sec.) | | | |
|---|---|---|---|---|
| | Not stirred | Stirred | Rod milled— | |
| | | | 20 mins. | 40 mins |
| 4D-grade asbestos untreated | 47.0 | 263.0 | 597.0 | 900.0 |
| 4D-grade asbestos treated with sodium silicate | 11.0 | 196.0 | 579.0 | 846.0 |
| 4D-grade asbestos treated with silica sol | 14.0 | 152.0 | 267.0 | 337.0 |

NOTE.—Freeness was determined as described hereinbefore in accordance with the "Freeness Tests for Asbestos" from "Testing Procedures for Chrysotile Asbestos Fiber," op. cit.

FIG. 1 is a graph showing the results obtained above.

TABLE XII

| Material | Filtration time of A.C. slurry (sec.) | | |
|---|---|---|---|
| | Fiber stirred | Fiber rod milled— | |
| | | 20 mins. | 40 mins. |
| 4D-grade asbestos untreated | 144.0 | 179.0 | 209.5 |
| 4D-grade asbestos treated with sodium silicate | 134.0 | 138.5 | 155.5 |
| 4D-grade asbestos treated with silica sol | 119.0 | 127.0 | 127.5 |

FIG. 2 is a graph showing the results obtained above.

Although some treated asbestos fibers were dried at 100° F. and others were dried at 105° C. before testing, this difference in temperature had little effect on the filtration rates. Raising further the drying temperature to even as high as 500° F. or 600° F. only slightly increased the rate of filtration. Preferred drying temperatures are from about 35° C. to about 105° C.

A silica sol obtained from a silicate solution having a high proportion of $SiO_2$ to $Na_2O$ is preferred since the $SiO_2$ content is the desired ingredient. Silica sols can also be made from sodium silicate solutions having a much lower $SiO_2:Na_2O$ ratio for example by neutralization of sodium metasilicate solution in which the $SiO_2:Na_2O$ ratio is 1. However, such sols, made with $H_3PO_4$, contain excessive amounts of sodium phosphate which may have a detrimental effect on the filtration properties of asbestos and, if made with HCl, contain excessive amounts of sodium chloride which may have an adverse effect on the strength of asbestos-cement products made from the asbestos so treated. If the silica sol is made from sodium silicate with a low ratio of $SiO_2:Na_2O$, such salts should preferably be removed from the silica sol by known means before treatment of the asbestos fiber. Silica sols obtained from silicates having a molecular ratio of $SiO_2:Na_2O$ of 2.0 or over and especially a ratio of 3.3 or over are preferred.

What is claimed is:
1. A process for improving the freeness of asbestos fibers wherein the process consists essentially of the steps of:
   (1) wetting the said fibers with an aqueous material consisting essentially of an aqueous silica sol; and
   (2) thereafter depositing said silica sol on the said fibers in amounts of between 0.2 to 2.5% by weight expressed as $SiO_2$ by drying the fibers and removing moisture therefrom.
2. Process as claimed in claim 1, wherein said amount is from 0.6% to about 1.4% by weight.
3. Process as claimed in claim 1, wherein said treated fibers are dried at a temperature of from about 100° F. to about 600° F.
4. Process as claimed in claim 1, wherein said treated fibers are dried at a temperature of from about 35° C. to about 105° C.
5. Process as claimed in claim 1, wherein said fibers are suspended in air and said aqueous silica sol is sprayed onto said suspended fibers.
6. The product obtained by the process of claim 1.

References Cited
UNITED STATES PATENTS 3,034,981  5/1962  Poelman et al. _____ 162—155X
3,224,927  12/1965  Brown et al. _____ 162—155
3,375,201  3/1968  Winyall _____ 23—182X HOWARD R. CAINE, Primary Examiner U.S. Cl. X.R.

23—182; 117—126; 162—155; 264—122